US010481698B2

(12) United States Patent
Park et al.

(10) Patent No.: US 10,481,698 B2
(45) Date of Patent: Nov. 19, 2019

(54) ELECTRONIC DEVICE AND METHOD FOR ACTIVATING APPLICATIONS THEREFOR

(71) Applicant: Samsung Electronics Co., Ltd., Gyeonggi-do (KR)

(72) Inventors: Kyungmin Park, Seoul (KR); Hyunsung Go, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 15/602,447

(22) Filed: May 23, 2017

(65) Prior Publication Data

US 2017/0357329 A1 Dec. 14, 2017

(30) Foreign Application Priority Data

Jun. 8, 2016 (KR) .................. 10-2016-0070737

(51) Int. Cl.
*G06F 3/01* (2006.01)
*G06F 1/3215* (2019.01)
(Continued)

(52) U.S. Cl.
CPC ............ *G06F 3/017* (2013.01); *G04C 3/002* (2013.01); *G06F 1/163* (2013.01); *G06F 1/324* (2013.01); *G06F 1/325* (2013.01); *G06F 1/3215* (2013.01); *G06F 1/3278* (2013.01); *G06F 3/014* (2013.01); *G04G 21/00* (2013.01)

(58) Field of Classification Search
CPC ........ G06F 3/017; G06F 1/3215; G06F 1/324; G06F 1/325
See application file for complete search history.

(56) References Cited

U.S. PATENT DOCUMENTS 7,903,115 B2 * 3/2011 Platzer .................. G06F 3/0485
345/473
9,354,727 B2 * 5/2016 Hughes ................ G06F 1/3206
(Continued)

FOREIGN PATENT DOCUMENTS

EP 3 009 912 A1 4/2016
KR 10-1398946 B1 5/2014
(Continued)

OTHER PUBLICATIONS

International Search Report dated Aug. 11, 2017.
European Search Report dated Jan. 30, 2019.

*Primary Examiner* — Peter C McLoone
(74) *Attorney, Agent, or Firm* — Cha & Reiter, LLC

(57) ABSTRACT

A method and an electronic device implementing the method are disclosed. The electronic device may include sensors, a memory and a processor executing instructions stored in the memory to: select at least one sensor of the one or more sensors to detect movement of the electronic device and select a sampling frequency of the selected at least one sensor based on usage state information of the electronic device, detect the movement of the electronic device using the selected at least one sensor at the selected sampling frequency, and when the detected movement corresponds to at least one preset condition of the one or more preset conditions, execute a specific application of the one or more applications associated with the at least one preset condition.

21 Claims, 15 Drawing Sheets

(51) Int. Cl.
  *G06F 1/324*   (2019.01)
  *G06F 1/3234*  (2019.01)
  *G04C 3/00*    (2006.01)
  *G06F 1/16*    (2006.01)
  *G04G 21/00*   (2010.01)

(56) References Cited

U.S. PATENT DOCUMENTS

| | | | |
|---|---|---|---|
| 9,767,735 B2* | 9/2017 | Mizukami | H04W 52/027 |
| 9,804,678 B2* | 10/2017 | Bezinge | G04G 17/045 |
| 2005/0172311 A1* | 8/2005 | Hjelt | A61B 5/1112 |
| | | | 725/10 |
| 2006/0132060 A1 | 6/2006 | Chen | |
| 2008/0165210 A1* | 7/2008 | Platzer | G06F 3/0485 |
| | | | 345/672 |
| 2009/0121870 A1 | 5/2009 | Green et al. | |
| 2013/0100044 A1* | 4/2013 | Zhao | G06F 1/1694 |
| | | | 345/173 |
| 2013/0229338 A1* | 9/2013 | Sohn | G06F 3/011 |
| | | | 345/156 |
| 2014/0168057 A1* | 6/2014 | Ahuja | G06F 3/017 |
| | | | 345/156 |
| 2014/0244505 A1 | 8/2014 | Kim | |
| 2014/0253487 A1* | 9/2014 | Bezinge | G04G 17/045 |
| | | | 345/173 |
| 2014/0283599 A1 | 9/2014 | Kim et al. | |
| 2014/0357392 A1 | 12/2014 | Goel et al. | |
| 2014/0358472 A1 | 12/2014 | Goel et al. | |
| 2015/0015477 A1* | 1/2015 | Hughes | G06F 1/3206 |
| | | | 345/156 |
| 2015/0281430 A1 | 10/2015 | Cho et al. | |
| 2016/0027386 A1* | 1/2016 | Mizukami | G09G 3/3406 |
| | | | 345/173 |
| 2016/0103495 A1 | 4/2016 | Takatsuka et al. | |
| 2016/0132102 A1* | 5/2016 | Nakagawa | G06F 1/163 |
| | | | 345/156 |

FOREIGN PATENT DOCUMENTS

| | | |
|---|---|---|
| KR | 10-2014-0116632 A | 10/2014 |
| KR | 10-1579585 B1 | 12/2015 |
| WO | 2014/194240 A1 | 12/2014 |

* cited by examiner

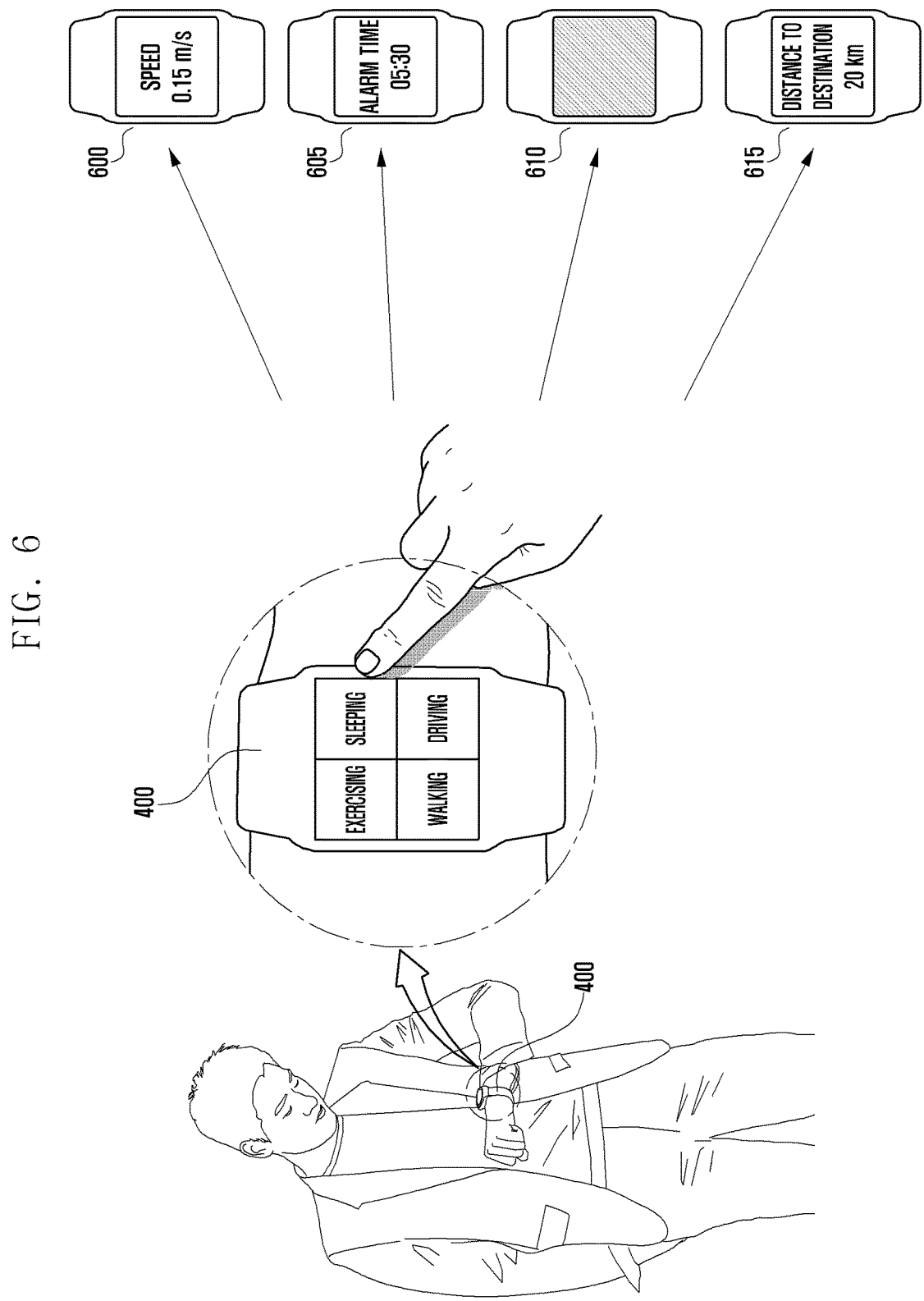

ELECTRONIC DEVICE AND METHOD FOR ACTIVATING APPLICATIONS THEREFOR

CLAIM OF PRIORITY

This application claims the benefit under 35 U.S.C. § 119(a) of a Korean patent application filed on Jun. 8, 2016, in the Korean Intellectual Property Office and assigned Serial No. 10-2016-0070737, the entire disclosure of which is hereby incorporated by reference.

TECHNICAL FIELD

The present disclosure relates to an electronic device and method for activating applications utilizing the electronic device.

BACKGROUND

With advances in communication technologies, electronic devices supporting various functions have become a necessity of modern life. Electronic devices have evolved into multimedia communication appliances that can provide voice call services, data transmission services, and other supplementary services. For example, such an electronic device may receive a broadcast or multicast signal to play back a video or TV program.

An electronic device may send data to another electronic device through wired or wireless communication such as Bluetooth or 3G mobile communication. For example, the electronic device may connect to a wearable device for data exchange through short-range communication.

Meanwhile, an electronic device may activate a specific application according to a motion detected by a sensor. For example, a wearable device worn by a user may activate a specific application (e.g., a clock application) responsive to a detected gesture of the user. However, when a wearable device activates a specific application according to only a detected gesture of the user, the application may be activated accidentally in response to an unintended gesture or accidental movement of the user. This may cause false detection of the user's intentions and increase current consumption due to unintended application activation and execution.

SUMMARY

Accordingly, an aspect of the present disclosure is to provide an electronic device and method for activating applications therefor while addressing the above problem.

In accordance with an aspect of the present disclosure, an electronic device is provided including one or more sensors, a processor, and a memory electrically coupled with the processor, storing one or more applications associated with one or more preset conditions, wherein the memory stores instructions executable by the processor to: select at least one sensor of the one or more sensors to detect movement of the electronic device and select a sampling frequency of the selected at least one sensor based on usage state information of the electronic device, detect the movement of the electronic device using the selected at least one sensor at the selected sampling frequency; and when the detected movement corresponds to at least one preset condition of the one or more preset conditions, execute a specific application of the one or more applications associated with the at least one preset condition.

In accordance with another aspect of the present disclosure, a method is disclosed including storing in memory one or more applications associated with one or more preset conditions, selecting, by a processor, at least one sensor among one or more sensors for detecting a movement of the electronic device, and selecting a sampling frequency for the selected at least one sensor based on usage state information of the electronic device, detecting the movement of the electronic device using the selected at least one sensor operating at the selected sampling frequency, and if the movement satisfies a preset condition of the one or more preset conditions, executing a specific application of the one or more applications associated with the preset condition.

In accordance with another aspect of the present disclosure, an electronic device is disclosed, including: a housing, a fastener mounted on a portion of the housing and removably attachable to a user, a display exposed through a portion of the housing, at least one sensor disposed within the housing and configured to detect movement of the electronic device, a processor disposed within the housing and electrically couple with the display and the at least one sensor, and a memory electrically coupled with the processor, the memory storing instructions executable by the processor to: receive first data from the at least one sensor when the display is deactivated, in response to detecting that the first data indicates that a first pattern of movement of the electronic device, activate the display, receive second data from the sensor after the display is activated, and in response to detecting that the second data indicates a second pattern of movement of the electronic device corresponding to a repetition of the first pattern or a portion of the first pattern, deactivate the display.

In a feature of the present disclosure, the electronic device may sense its movement in consideration of the frequency of application activation. Hence, it is possible to reduce false sensing and current consumption.

The electronic device may sense its movement in consideration of user state information (e.g. heart rate and body temperature). Hence, it is possible to reduce false sensing and current consumption through sensor optimization.

In addition, when the pattern of user movement for application activation is repetitive, the electronic device may deactivate the display, reducing false sensing and current consumption.

BRIEF DESCRIPTION OF THE DRAWINGS

The above and other aspects and features of certain embodiments of the present disclosure will be more apparent from the following detailed description taken in conjunction with the accompanying drawings, in which:

FIG. 6 illustrates a case where the electronic device performs different functions depending upon user states according to various embodiments of the present disclosure;

DETAILED DESCRIPTION

Figure 1:
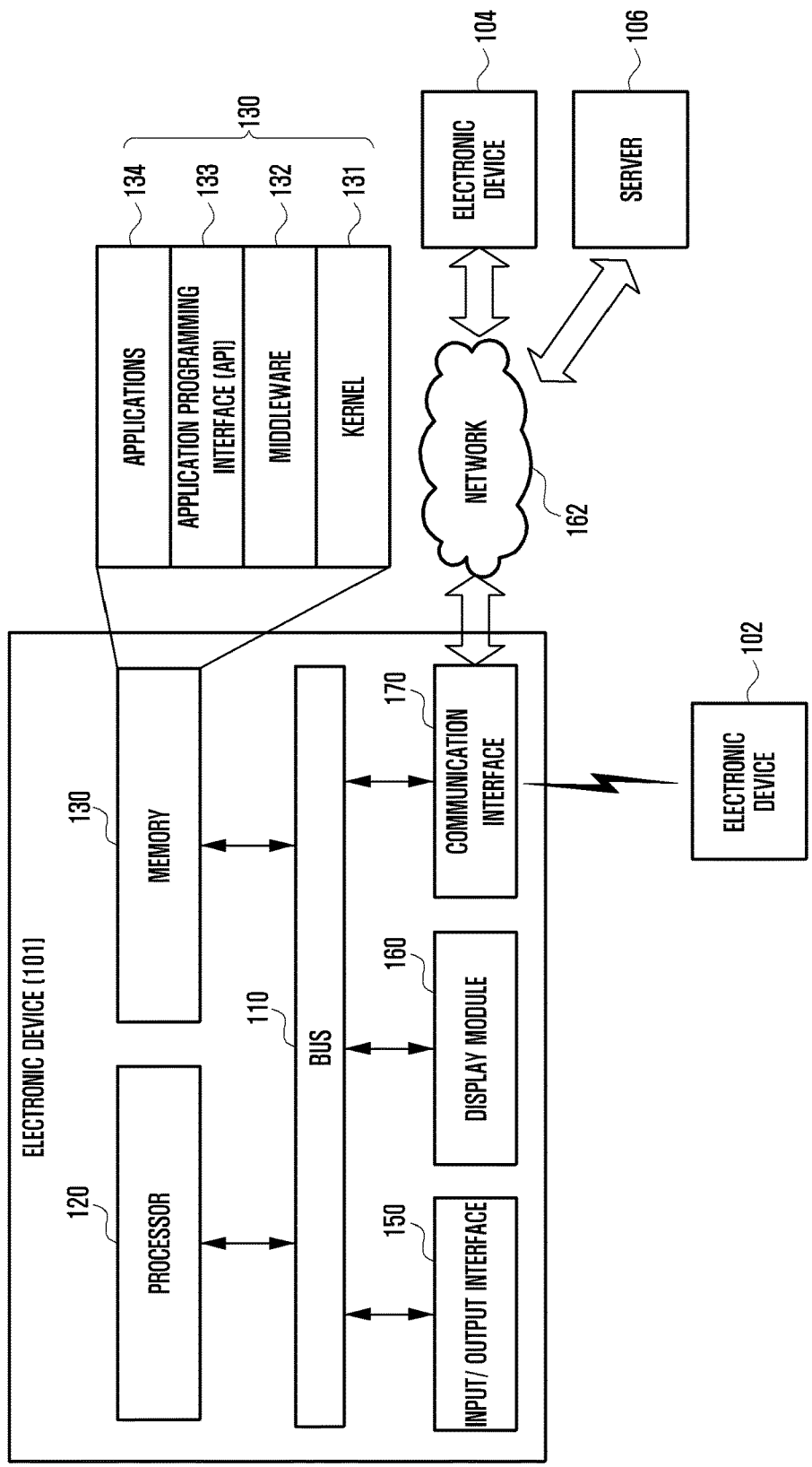
FIG. 1 illustrates a network environment including electronic devices according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely an example. Accordingly, those of ordinary skill in the art will recognize that various changes and modifications of the various embodiments described herein can be made without departing from the present disclosure. In addition, descriptions of well-known functions and constructions may be omitted for clarity and conciseness.

The terms and words used in the following description and claims are not limited to the dictionary meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 is a block diagram illustrating a configuration of an electronic device according to an embodiment of the present disclosure.

Referring to FIG. 1, the electronic device 101 may include a bus 110, a processor 120, a memory 130, an input/output interface 150, a display 160 and a communication interface 170, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, input/output interface 150, the display 160, the communication interface 170, etc.) through the bus 110, may interpret the received commands, and may execute calculation or data processing according to the interpreted commands. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 may store commands or data received from the processor 120 or other elements (e.g., the input/output interface 150, a display 160 and a communication interface 170, etc.) or generated by the processor 120 or the other elements. The memory 130 may include programming modules, such as a kernel 131, middleware 132, an Application Programming Interface (API) 133, an application (or applications) 134, and the like. Each of the above-described programming modules may be implemented in software, firmware, hardware, or a combination of two or more thereof.

The kernel 131 may control or manage system resources (e.g., the bus 110, the processor 120, the memory 130, and/or other hardware and software resources) used to execute operations or functions implemented by other programming modules (e.g., the middleware 132, the API 133, and the application 134). Also, the kernel 131 may provide an interface capable of accessing and controlling or managing the individual elements of the electronic device 101 by using the middleware 132, the API 133, or the application 134.

The middleware 132 may serve to go between the API 133 or the application 134 and the kernel 131 in such a manner that the API 133 or the application 134 communicates with the kernel 131 and exchanges data therewith. Also, in relation to work requests received from one or more applications 134 and/or the middleware 132, for example, may perform load balancing of the work requests by using a method of assigning a priority, in which system resources (e.g., the bus 110, the processor 120, the memory 130, etc.) of the electronic device 101 can be used, to at least one of the one or more applications 134.

The API 133 is an interface through which the application 134 is capable of controlling a function provided by the kernel 131 or the middleware 132, and may include, for example, at least one interface or function for file control, window control, image processing, character control, or the like.

The input/output interface 150, for example, may receive a command or data as input from a user, and may deliver the received command or data to the processor 120 or the memory 130 through the bus 110. The display module 160 may display a video, an image, data, or the like to the user.

The communication interface module 170 may connect communication between another electronic device 102 and the electronic device 101. The communication interface module 170 may support a predetermined short-range communication protocol (e.g., Wi-Fi, BlueTooth (BT), and Near Field Communication (NFC)), or predetermined network 162 (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 may be a device which is identical (e.g., of an identical type) to or different (e.g., of a different type) from the electronic device 101. Further, the communication interface module 170 may connect communication between a server 106 and the electronic device 101 via the network 162.

Figure 2:
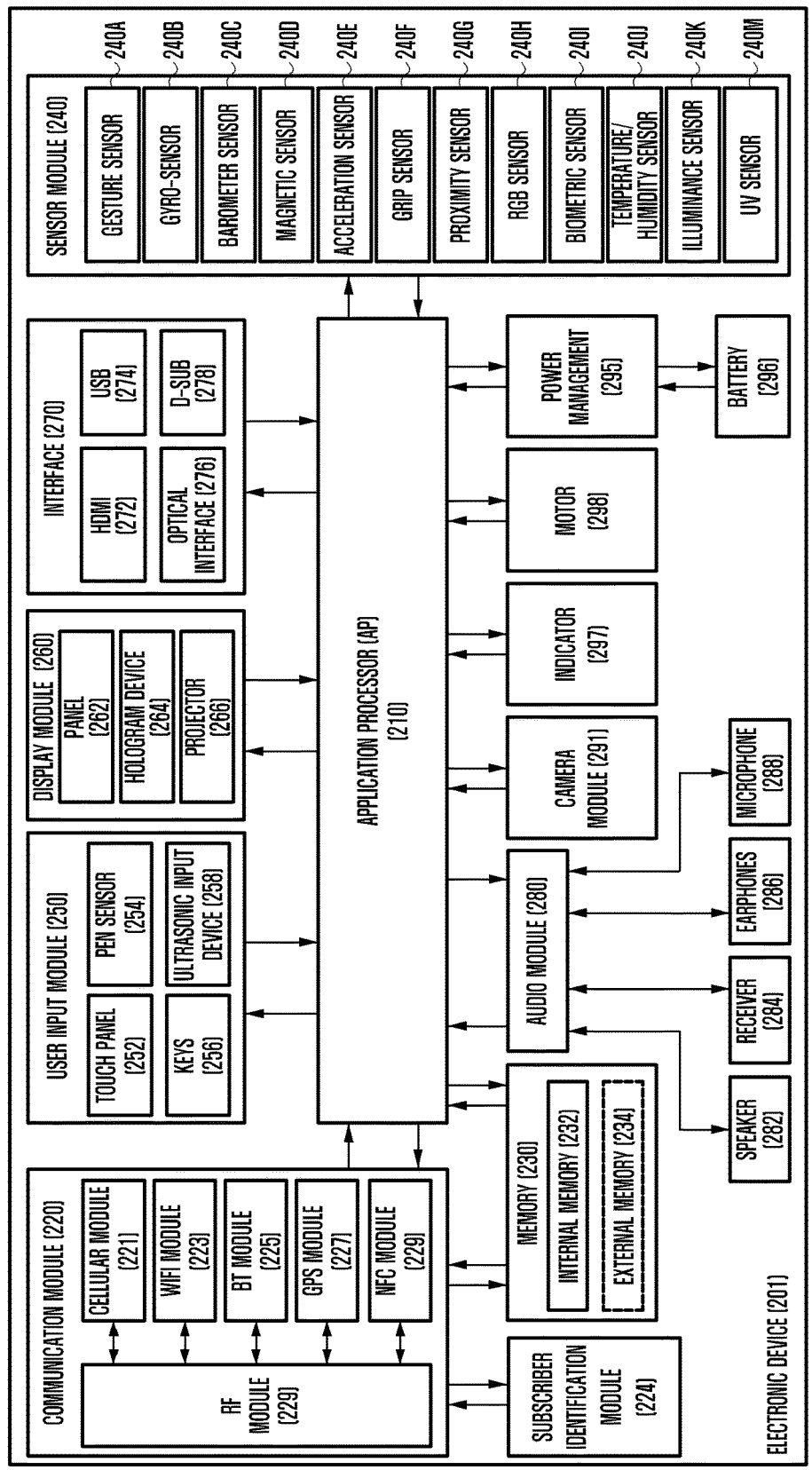
FIG. 2 is a block diagram of an electronic device according to various embodiments of the present disclosure.

FIG. 2 is a block diagram illustrating a configuration of an electronic device 201 according to an embodiment of the present disclosure.

The hardware shown in FIG. 2 may be, for example, the electronic device 101 illustrated in FIG. 1.

Referring to FIG. 2, the electronic device may include one or more application processors 210, a communication module 220, a Subscriber Identification Module (SIM) card 224, a memory 230, a sensor module 240, a input device 250, a display module 260, an interface 270, an audio module 280, a camera module 291, a power management module 295, a battery 296, an indicator 297, a motor 298 and any other similar and/or suitable components.

The Application Processor (AP) 210 (e.g., the processor 120) may include one or more Application Processors (APs), or one or more to Communication Processors (CPs). The application processor 210 may be, for example, the processor 120 illustrated in FIG. 1. The AP 210 is illustrated as being included in the application processor 210 in FIG. 2, but may be included in different Integrated Circuit (IC) packages, respectively. According to an embodiment of the present disclosure, the AP 210 may be included in one IC package.

The AP 210 may execute an Operating System (OS) or an application program, and thereby may control multiple hardware or software elements connected to the AP 210 and may perform processing of and arithmetic operations on various data including multimedia data. The AP 210 may be implemented by, for example, a System on Chip (SoC). According to an embodiment of the present disclosure, the AP 210 may further include a Graphical Processing Unit (GPU) (not illustrated).

The AP 210 may manage a data line and may convert a communication protocol in the case of communication between the electronic device (e.g., the electronic device 101) including the hardware and different electronic devices connected to the electronic device through the network. The AP 210 may be implemented by, for example, a SoC. According to an embodiment of the present disclosure, the AP 210 may perform at least some of multimedia control functions. The AP 210, for example, may distinguish and authenticate a terminal in a communication network by using a subscriber identification module (e.g., the SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 210, the power management module 295, the memory 230, and the like are illustrated as elements separate from the AP 210. However, according to an embodiment of the present disclosure, the AP 210 may include at least some (e.g., the CP) of the above-described elements.

According to an embodiment of the present disclosure, the AP 210 may load, to a volatile memory, a command or data received from at least one of a non-volatile memory and other elements connected to each of the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 101. The SIM card 224 may include unique identification information (e.g., Integrated Circuit Card IDentifier (ICCID)) or subscriber information (e.g., International Mobile Subscriber Identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 232 may be in the form of a Solid State Drive (SSD). The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module 220 may include a cellular module 221, a wireless (WiFi) communication module 223 or a Radio Frequency (RF) module 229. The communication module 220 may be, for example, the communication interface 170 illustrated in FIG. 1. The communication module 220 may include, for example, a Wi-Fi module (or part) 223, a BT part 225, a GPS part 227, or a NFC part 229. For example, the wireless communication module 220 may provide a wireless communication function by using a radio frequency. Additionally or alternatively, the wireless communication module 220 may include a network interface (e.g., a LAN card), a modulator/demodulator (modem), or the like for connecting the hardware to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF unit 229 may include, for example, a transceiver, a Power Amplifier Module (PAM), a frequency filter, a Low Noise Amplifier (LNA), or the like. Also, the RF module 229 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, an barometer sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, an illuminance sensor 240K, and a Ultra Violet (UV) sensor 240M. The sensor module 240 may measure a physical quantity or may sense an operating state of the electronic device 101, and may convert the measured or sensed information to an electrical signal. Additionally/alternatively, the sensor module 240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The input device 250 may include a touch panel 252, a pen sensor 254 (e.g., a digital pen sensor), keys 256, and an ultrasonic input unit 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the hardware may receive a user input from an external device (e.g., a network, a computer, or a server), which is connected to the communication module 220, through the communication module 220.

The display module 260 may include a panel 262, a hologram 264, or projector 266. The display module 260 may be, for example, the display module 160 illustrated in FIG. 1. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may include the touch panel 252 and one module. The hologram 264 may display a three-dimensional image in the air by using interference of light. According to an embodiment of the present disclosure, the display module 260 may further include a control circuit for controlling the panel 262 or the hologram 264.

The interface 270 may include, for example, a High-Definition Multimedia Interface (HDMI) 272, a Universal Serial Bus (USB) 274, an optical interface 276, and a D-subminiature (D-sub) 278. Additionally or alternatively, the interface 270 may include, for example, SD/Multi-Media Card (MMC) (not illustrated) or Infrared Data Association (IrDA) (not illustrated).

The audio module (or codec) 280 may bidirectionally convert between a voice and an electrical signal. The audio module 280 may convert voice information, which is input to or output from the audio module 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an Image Signal Processor (ISP) (not illustrated), and a flash LED (not illustrated).

The power management module 295 may manage power of the hardware. Although not illustrated, the power management module 295 may include, for example, a Power Management Integrated Circuit (PMIC), a charger Integrated Circuit (IC), or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware or a part (e.g., the AP 211) of the hardware, for example, a booting state, a message state, a charging state and the like. The motor 298 may convert an electrical signal into a mechanical vibration. The application processor 210 may control the sensor module 240.

Although not illustrated, the hardware may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like. Each of the above-described elements of the hardware according to an embodiment of the present disclosure may include one or more components, and the name of the relevant element may change depending on the type of electronic device. The hardware according to an embodiment of the present disclosure may include at least one of the above-described elements. Some of the above-described elements may be omitted from the hardware, or the hardware may further include additional elements. Also, some of the elements of the hardware according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an Application-Specific Integrated Circuit (ASIC) chip, a Field-Programmable Gate Array (FPGA), and a programmable-logic device for performing certain operations which have been known or are to be developed in the future.

Figure 3:
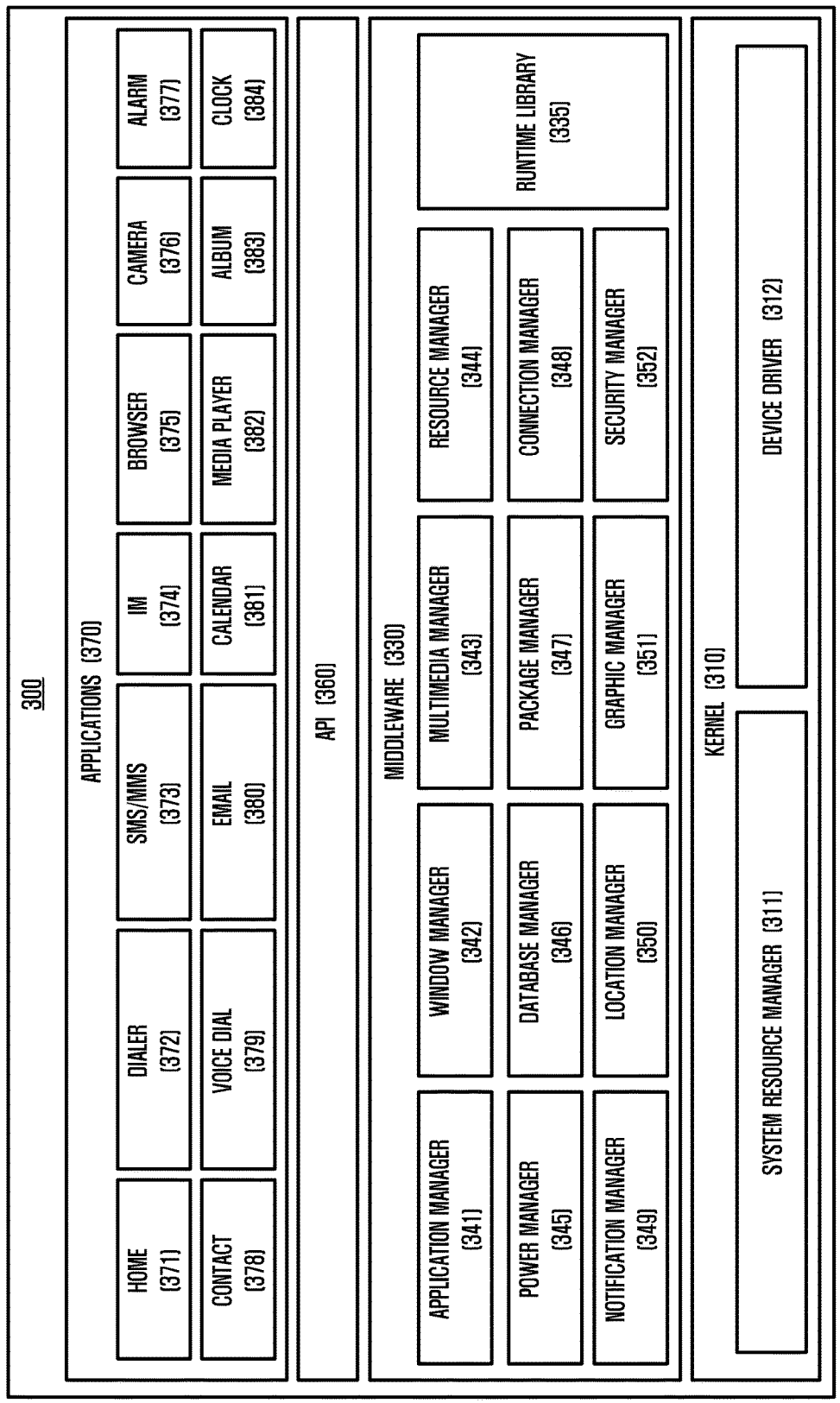
FIG. 3 is a block diagram of a program module according to various embodiments of the present disclosure.

FIG. 3 is a block diagram illustrating a configuration of one or more programming modules 300 according to an embodiment of the present disclosure.

The programming module 300 may be included (or stored) in the electronic device 101 (e.g., the memory 130) or may be included (or stored) in the electronic device 201 (e.g., the memory 230) illustrated in FIG. 1. At least a part of the programming module 300 may be implemented in software, firmware, hardware, or a combination of two or more thereof. The programming module 300 may be implemented in hardware (e.g., the hardware), and may include an OS controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the application 370.

The kernel 310 (e.g., the kernel 131) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more application processors 210), the one or more processors may perform functions corresponding to the instructions. The non-transitory computer-readable storage medium may be, for example, the memory 230. At least a part of the programming module 300 may be implemented (e.g., executed) by, for example, the one or more application processors 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

Figure 4:
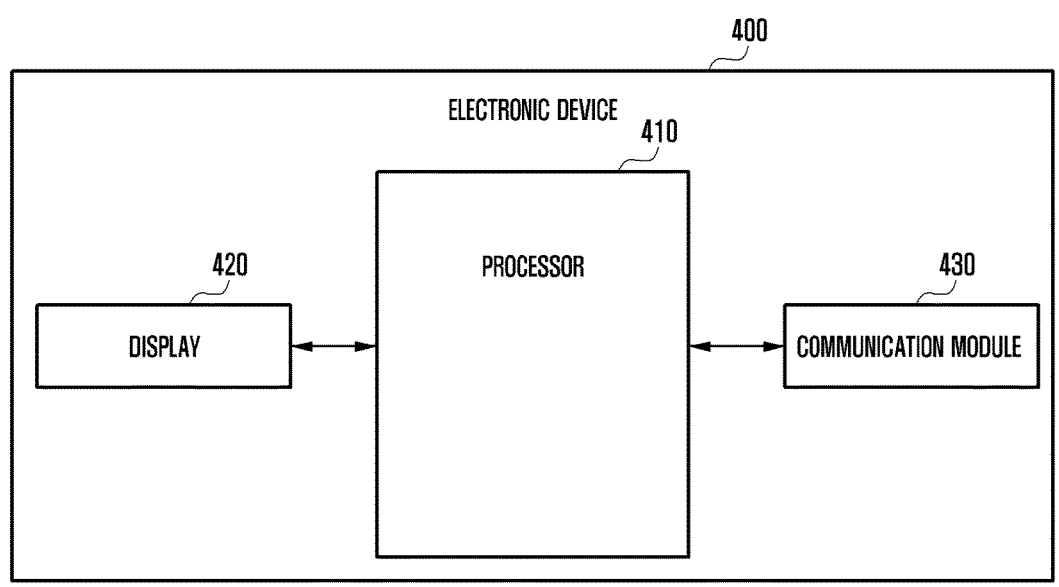
FIG. 4 is a block diagram of an electronic device according to various embodiments of the present disclosure.

FIG. 4 is a block diagram of an electronic device according to various embodiments of the present disclosure.

Referring to FIG. 4, the electronic device 400 may include a processor 410, a display 420, a communication module 430, and a memory (not shown) electrically connected with the processor 410. One of the above components of the electronic device 400 may be omitted, or a new component may be added to the electronic device 400.

The electronic device 400 may correspond to the electronic device 101 of FIG. 1 and/or the electronic device 200 of FIG. 2. In one embodiment, the electronic device 400 may be a wearable device. The processor 410 may correspond to the processor 120 of FIG. 1 and/or the application processor 210 of FIG. 2.

The electronic device 400 may include: a housing; a fastener mounted on a portion of the housing and removably attachable to a portion of the body of the user; the display 420 exposed through a portion of the housing; and at least one sensor positioned inside the housing and generating data indicating movement of the electronic device 400 through sensing. In one embodiment, the at least one sensor may include one or more sensors of the sensor module 240 of FIG. 2 (e.g. gesture sensor 240A, gyro sensor 240B, and acceleration sensor 240E). The electronic device 400 may include the processor 410 positioned inside the housing and electrically connected with the display 420 and the sensor, and a memory (not shown) electrically connected with the processor 410.

The memory (not shown) may store a software program triggering one or more application programs upon occurrence of a preset condition. The memory may store instructions that, when executed, cause the processor 410 to perform a specific function.

In one embodiment, the processor 410 may use at least one sensor (e.g. gyro sensor and acceleration sensor) to sense movement of the electronic device 400. The sensor used to sense movement of the electronic device 400 may be set by default. For example, when the electronic device 400 is a wearable device worn on a portion of the body of the user, the electronic device 400 may configure the acceleration sensor as a default sensor to sense its movement.

In one embodiment, the electronic device 400 may activate a specific application (e.g. clock application) if sensed movement data satisfies a preset condition. For example, when the electronic device 400 is worn as a wearable device on the wrist of the user, it may detect a motion (e.g. wrist-up) activating a specific application. For example, when the acceleration sensor is used, if a preset number of sensor sample values (e.g. x, y, z-axis values at a point in time) fall within the range set for activating an application, the electronic device 400 may activate the application. As another example, when the gyro sensor is used, if the rotation angle sensed by the gyro sensor falls within the range set for activating an application, the electronic device 400 may activate the application. As another example, when the acceleration sensor and the gyro sensor are both used, the electronic device 400 may determine whether to activate a specific application by calculating the rotation angle thereof using gyro sensor sample values and identifying the current location thereof using acceleration sensor sample values. Here, application activation may indicate activating an application with a specific function or turning on the screen on the display 420.

In one embodiment, the processor 410 may determine at least one of the sensor to be used to sense the movement of the electronic device 400 and the sampling frequency of the above sensor on the basis of usage state information of the electronic device 400. The usage state information may include information regarding at least one of the frequency of application activations during a preset period and the state of the user of the electronic device 400. An acceleration sensor and a gyro sensor may be used to sense the movement of the electronic device 400. Such a sensor may sample the movement value of the electronic device 400. For example, the acceleration sensor may sample the movement value of the electronic device 400 two or three times per preset period. The movement of the electronic device 400 may be accurately identified with the increasing sampling frequency. For example, three-times sampling per period may be better than two-times sampling per period for identifying the movement of the electronic device 400.

It is possible to use multiple sensors for accurately identifying the movement of the electronic device 400. For example, use of two sensors (e.g. acceleration sensor and gyro sensor) may be better than use of one sensor (e.g. acceleration sensor) with two-times sampling for identifying the movement of the electronic device 400.

In one embodiment, the processor 410 may determine or change at least one of the sensor to be used to sense the movement of the electronic device 400 and the sampling frequency of the above sensor on the basis of the frequency of activations of a given application.

The processor 410 may count the number of times that a given application is activated (e.g. output on the display 420) during a preset duration (e.g. one hour or two hours) after initial activation (e.g. booting). For example, to measure the frequency of application activations, the processor 410 may count the number of times that the application is activated during a preset duration after initial activation. As another example, when a specific application is initially activated at 1:00 p.m., the processor 410 may count the number of times that the application is activated for one hour (preset duration) from 1:00 p.m. to 2:00 p.m. The preset duration may be stored in the memory in advance and may be changed according to user input.

When the application is activated again (second activation) after expiration of the preset duration from initial activation, the processor 410 may count the number of times that the application is activated during the preset duration after the time when the application was activated again. For example, when the application is initially activated at 1:00 p.m. and is activated again at 11:00 a.m. (second activation), the processor 410 may count the number of times that the application is activated for the preset duration (one hour) from 11:00 a.m. to 12:00 a.m.

In one embodiment, the processor 410 may determine or change at least one of the sensor to be used to sense the movement of the electronic device 400 and the sampling frequency of the above sensor according to whether the counted number of application activations exceeds at least one of multiple thresholds. For example, when the counted number of application activations exceeds one of multiple thresholds (e.g. 20, 40 and 50), the processor 410 may change the sensor to be used to sense the movement of the electronic device 400. The thresholds may be set in advance and may be changed later. For example, the thresholds may be set according to the stored information on the average usage pattern for the electronic device 400.

For example, if the number of application activations counted during a given time (e.g. one hour) exceeds a first threshold (e.g. 20), the processor 410 may change the sampling frequency of the acceleration sensor from 2 to 3. Here, the movement value of the electronic device 400 is sampled by the acceleration sensor at the sampling frequency. The movement of the electronic device 400 may be accurately identified or measured with the increasing sampling frequency. If the number of application activations exceeds a second threshold (e.g. 40), the processor 410 may monitor the movement of the electronic device 400 by using the acceleration sensor with a sampling frequency of 2 and the gyro sensor instead of using the acceleration sensor with a sampling frequency of 3. Here, use of both the acceleration sensor and the gyro sensor may be better than use of the acceleration sensor for accurately measuring the movement of the electronic device 400.

In one embodiment, the processor 410 may utilize the number of application activations counted during a first interval of a given time to determine at least one of the sensor to be used to sense the movement of the electronic device 400 and the sampling frequency of the above sensor during a second interval after the first interval.

For example, assume that the application is activated at 3:00 p.m. and the given time is one hour. If the number of application activations exceeds the first threshold of 20 at 3:40 p.m., the processor 410 may change the sampling frequency of the acceleration sensor from 2 to 3 at 3:40 p.m. At the end of the first interval (4:00 p.m.), the movement of the electronic device 400 may be monitored by the acceleration sensor with a sampling frequency of 3.

Thereafter, during the second interval from 4:00 p.m. to 5:00 p.m. (one hour), the processor 410 may continue to use the acceleration sensor with a sampling frequency of 3. If the number of application activations is less than 20 during the second interval, the processor 410 may change the sampling frequency of the acceleration sensor from 3 to 2 at 6:00 p.m. (start of the third interval). If the number of application activations is greater than 20 during the second interval, the processor 410 may continue to use the acceleration sensor with a sampling frequency of 3.

In one embodiment, the processor 410 may utilize the number of application activations counted during a first section of one interval to change at least one of the sensor to be used to sense the movement of the electronic device 400 and the sampling frequency of the above sensor during the remaining section of the interval. For example, when the acceleration sensor with a sampling frequency of 3 is used during the second interval from 4:00 p.m., if the number of application activations exceeds the second threshold of 40 at 4:30 p.m., the processor 410 may use the acceleration sensor with a sampling frequency of 2 and the gyro sensor to sense the movement of the electronic device 400 from 4:30 p.m.

In various embodiments, the processor 410 may identify the state (e.g. driving, exercising, walking, or sleeping) of the user on the basis of sensing data obtained by at least one sensor (e.g. biosensor). For example, the processor 410 may identify an increase in heart rate or a change in body temperature by use of a biosensor. When the heart rate is greater than or equal to a first threshold, the processor 410 may determine that the user is exercising. When the heart rate is less than a second threshold, the processor 410 may determine that the user is sleeping. Here, the first and second thresholds may be determined on the basis of average data values stored in the electronic device 400.

In one embodiment, the processor 410 may identify the state of the user on the basis of user input selecting one of user states. For example, the processor 410 may output a user interface (UI) window showing user states (e.g. driving, exercising, walking, and sleeping) on the display 420 and receive user input for selecting one of the user states on the user interface window.

In one embodiment, the processor 410 may determine at least one of the sensor to be used to sense the movement of the electronic device 400 and the sampling frequency of the above sensor on the basis of user input indicating the user state.

In one embodiment, upon determining that the user of the electronic device 400 is driving, the processor 410 may sense the movement of the electronic device 400 by use of the acceleration sensor and gyro sensor. For example, the processor 410 may deactivate a specific application upon determining that an up-and-down motion sensed by the gyro sensor senses (e.g. movement along the z-axis) is caused by turning the steering wheel.

In one embodiment, upon determining that the user of the electronic device 400 is exercising, the processor 410 may deactivate a function corresponding to repetitive sensing data for a preset duration. For example, when the user of the electronic device 400 is playing tennis, the processor 410 may deactivate an application corresponding to a left and right motion sensed by the gyro sensor (e.g. movement along the x-axis).

In one embodiment, upon determining that the user of the electronic device 400 is walking, the processor 410 may deactivate a specific application when the gyro sensor fails to sense a motion in a desired direction (e.g. movement along the z-axis).

In one embodiment, upon determining that the user of the electronic device 400 is sleeping, the processor 410 may deactivate a specific application when a sudden change in motion of the electronic device 400 is not detected.

In one embodiment, the processor 410 may apply different algorithms for different user states and change algorithms applied to a specific user state.

In various embodiments, the graphical user interface (GUI) of an activated application may have different images or colors for different user states. For example, the processor 410 may display a speed UI, an exercise UI, a lock screen, and a low luminance screen upon determining that the user is driving, exercising, walking, and sleeping, respectively.

In various embodiments, when the display 420 is turned off, the processor 410 may receive first data from the sensor. Here, the first data may be associated with the movement of the electronic device 400. If the first data indicates a first pattern of movement for the electronic device 400, the processor 410 may turn on the display 420. Here, the first pattern may be an indication for activation of the display 420.

In one embodiment, the processor 410 may receive second data from the sensor after the display 420 is turned on. Here, the second data may be associated with the movement of the electronic device 400. If the second data corresponds to a repetition of the first pattern or a portion of the first pattern, the processor 410 may turn off the display 420. For example, to reduce the current consumed by the electronic device 400, when repetitive movement data is detected, the processor 410 may change the condition for application activation to thereby turn off the display 420 or keep the display 420 off.

The display 420 may correspond to the display 160 of FIG. 1 and/or the display module 260 of FIG. 2. The display 420 may be used to display application related data.

The communication module 430 may correspond to the communication interface 170 of FIG. 1 and/or the communication module 220 of FIG. 2. The communication module 430 may be used to send and receive data to and from another electronic device through short-range communication.

According to various embodiments of the present disclosure, the electronic device 400 may include a processor 410 and a memory (not shown) electrically connected with the processor 410. The memory may store a software program triggering one or more application programs upon occurrence of a preset condition. The memory may store instructions that, when executed, cause the processor 410 to: determine at least one of the sensor to be used to sense the movement of the electronic device 400 and the sampling frequency of the above sensor on the basis of usage state information of the electronic device 400; sense the movement of the electronic device 400 on the basis of the determination result; and activate a specific application if sensed movement data satisfies a preset condition.

The usage state information may include information regarding at least one of the frequency of activations of the application during a preset period and the state of the user of the electronic device 400.

The instructions may cause the processor 410 to count the number of times that the application is activated during a preset duration after initial activation, and to count, if the application is activated again after expiration of the preset duration from initial activation, the number of times that the application is activated during the preset duration after the time when the application was activated again.

The instructions may cause the processor 410 to determine at least one of the sensor to be used to sense the movement of the electronic device 400 and the sampling frequency of the above sensor according to whether the counted number of application activations exceeds at least one of multiple thresholds.

The instructions may cause the processor 410 to utilize the number of application activations counted during a first interval of a given duration for determining at least one of the sensor to be used to sense the movement of the electronic device 400 and the sampling frequency of the above sensor during a second interval after the first interval.

The instructions may cause the processor 410 to change at least one of the sensor to be used to sense the movement of the electronic device 400 and the sampling frequency of the above sensor according to the number of application activations counted during the second interval.

The instructions may cause the processor 410 to identify the state of the user on the basis of sensing data obtained by at least one sensor or user input selecting one of user states.

The instructions may cause the processor 410 to: display a UI window showing multiple user states on the screen; receive user input for selecting one of the user states on the UI window; and determine at least one of the sensor to be used to sense the movement of the electronic device 400 and the sampling frequency of the above sensor according to the received user input. When the application is activated in response to user input, the graphical user interface (GUI) of the application may have different images for different user states.

The electronic device 400 may be a wearable device having a display, the sensor may include a gyro sensor and an acceleration sensor, and the application may be a clock application.

Figure 5:
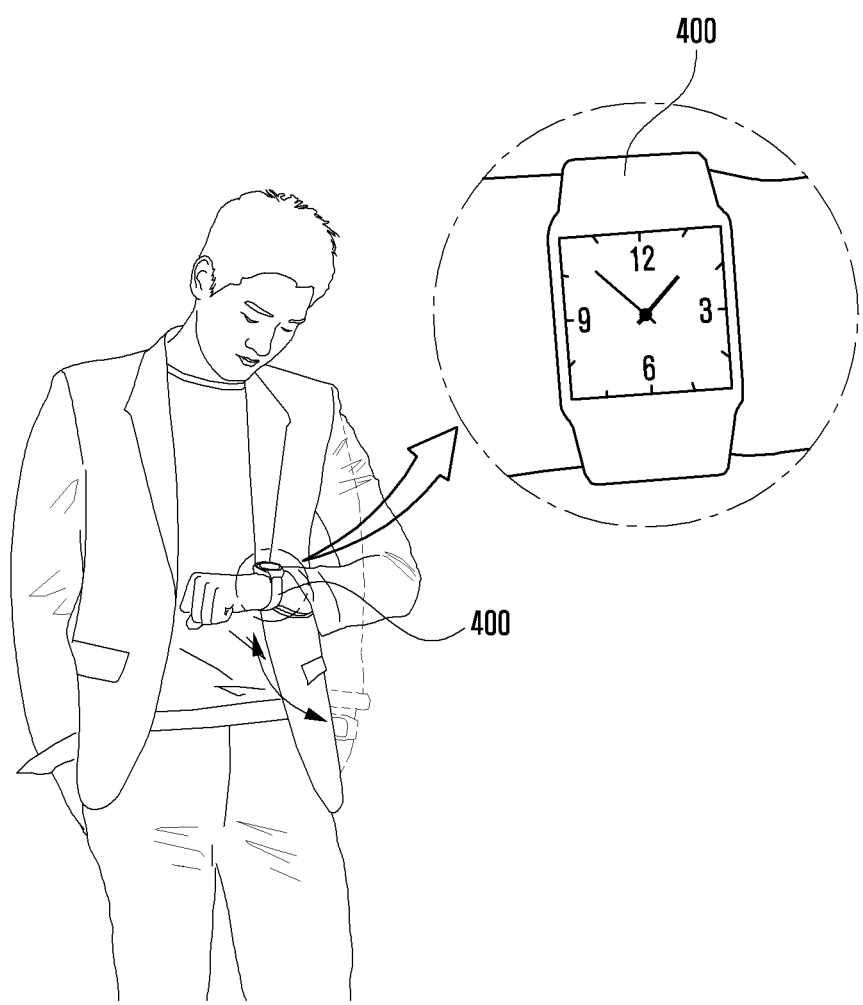
FIG. 5 illustrates application activation in the electronic device according to various embodiments of the present disclosure.

FIG. 5 illustrates application activation in the electronic device 400 according to various embodiments of the present disclosure.

The electronic device 400 may be a wearable device. The electronic device 400 may activate the clock screen in response to a user gesture sensed by the sensor without separate manipulation of the user. For example, when sensed movement values (e.g. acceleration values, gyro values) satisfy a preset reference value, the electronic device 400 may turn on the display. The reference movement value may be stored in the memory and may be changed according to the usage pattern or user input.

FIG. 6 illustrates a case where the electronic device performs different functions depending upon user states according to various embodiments of the present disclosure.

Referring to FIG. 6, the electronic device 400 may receive user input for selecting one of user states. The electronic device 400 may display a window corresponding to the user input. The electronic device 400 may display different UI windows for different user states. For example, when the user state is "exercising", the electronic device 400 may display a running speed (e.g. speed 0.15 m/s) on the screen 600. When the user state is "sleeping", the electronic device 400 may display an alarm time (e.g. alarm for 05:30) on the screen 605. When the user state is "walking", the electronic device 400 may lock the screen 610. When the user state is "driving", the electronic device 400 may receive destination information from a connected external device (e.g. mobile phone or automotive navigation system) and display the remaining distance to the destination (e.g. 20 km to destination) on the screen 615.

FIGS. 7A to 7E illustrate different schemes for application activation in the electronic device according to various embodiments of the present disclosure.

Figure 7A:
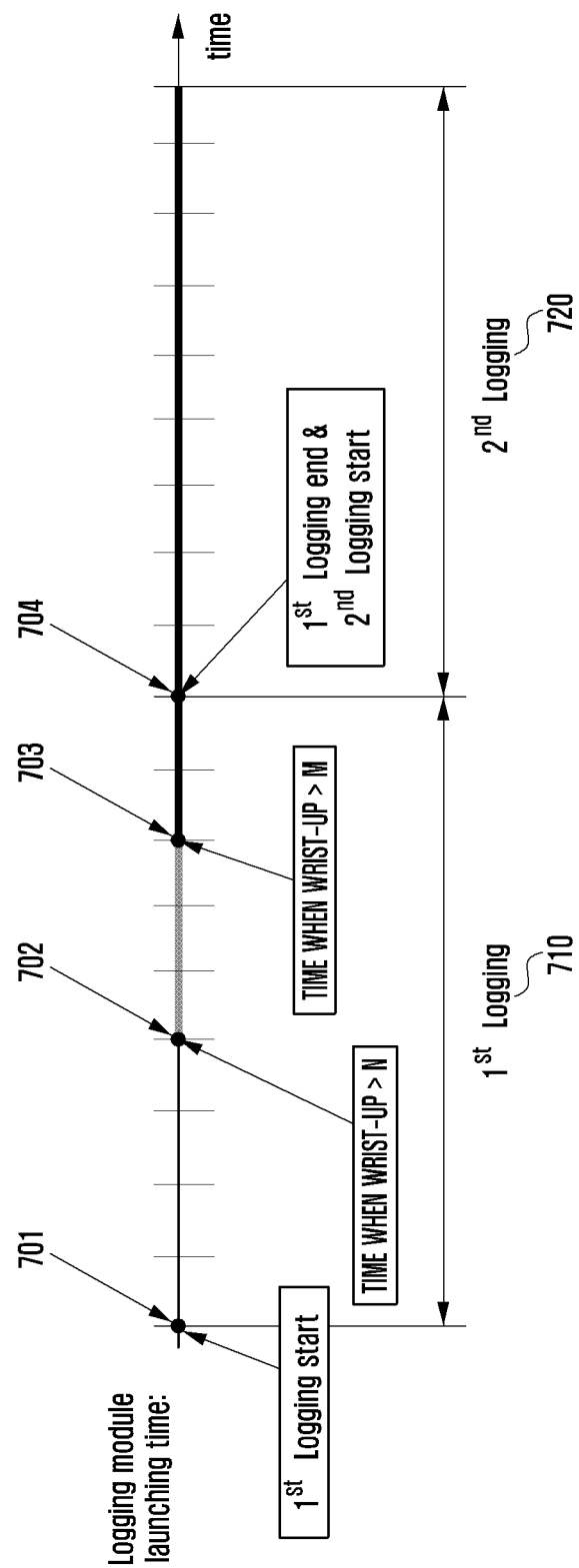
FIG. 7A, FIG. 7B, FIG. 7C, FIG. 7D and FIG. 7E illustrate different schemes for application activation in the electronic device according to various embodiments of the present disclosure.

Referring to FIG. 7A, the electronic device 400 may count the number of times that the application is activated during a preset duration. The electronic device 400 may count the number of times that the application is activated during a preset duration after initial activation at time 701. The electronic device 400 may count the number of application activations during a first interval 710 of a preset duration (e.g. one hour or two hours) and a second interval 720, respectively. The electronic device 400 may use a default sensor with a default sampling frequency to sense its movement. For example, the electronic device 400 may use the acceleration sensor with a sampling frequency of 2 by default.

When the number of application activations exceeds a first threshold (e.g. n) at time 702, the electronic device 400 may change the sampling frequency of the acceleration sensor from 2 to 3. That is, from time 702 when the number of application activations exceeds the first threshold, the electronic device 400 may use the acceleration sensor with a sampling frequency of 3 to sense its movement. When the number of application activations exceeds a second threshold (e.g. m) at time 703, the electronic device 400 may monitor its movement by using the acceleration sensor with a sampling frequency of 2 and the gyro sensor. That is, from time 703 when the number of application activations exceeds the second threshold, the electronic device 400 may use the acceleration sensor with a sampling frequency of 2 and the gyro sensor to monitor the movement of the electronic device 400.

At time 704 when the first interval 710 ends and the second interval 720 begins, the electronic device 400 may continue to use the acceleration sensor with a sampling frequency of 2 and the gyro sensor to monitor its movement. During the second interval 720, the electronic device 400 may monitor its movement by using the acceleration sensor with a sampling frequency of 2 and the gyro sensor.

Figure 7B:
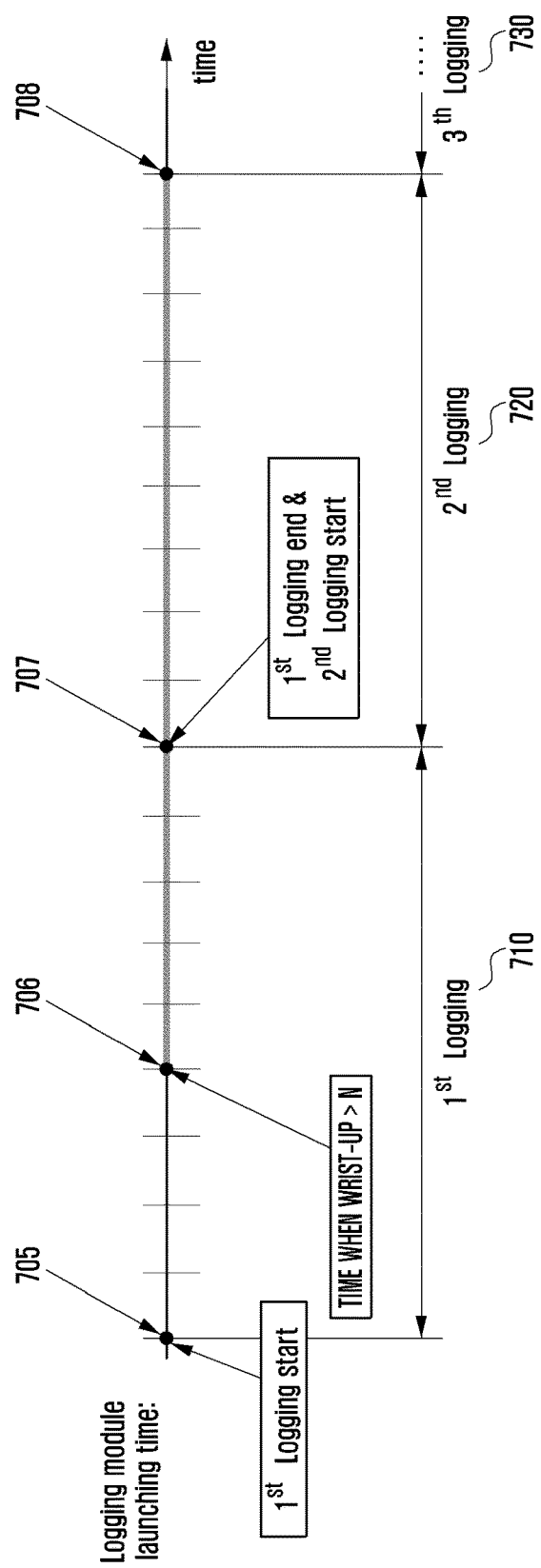

Referring to FIG. 7B, the electronic device 400 may use the acceleration sensor with a sampling frequency of 2 by default to monitor its movement. The electronic device 400 may count the number of times that the application is activated during a preset duration after initial activation at time 705. When the number of application activations exceeds a first threshold (e.g. n=20) at time 706, the electronic device 400 may use the acceleration sensor with a sampling frequency of 3 to monitor its movement.

At time 707 when the first interval 710 ends and the second interval 720 begins, the electronic device 400 may continue to use the acceleration sensor with a sampling frequency of 3 to monitor its movement. During the second interval 720, the electronic device 400 may monitor its movement by using the acceleration sensor with a sampling frequency of 3.

If the number of application activations is less than or equal to the first threshold during the second interval 720, the electronic device 400 may use the acceleration sensor with a sampling frequency of 2 according to default settings. For example, from time 708 when the second interval 720 ends, the electronic device 400 may use the acceleration sensor with a sampling frequency of 2 to monitor its movement. During the third interval 730, the electronic device 400 may monitor its movement by using the acceleration sensor with a sampling frequency of 2.

Figure 7C:
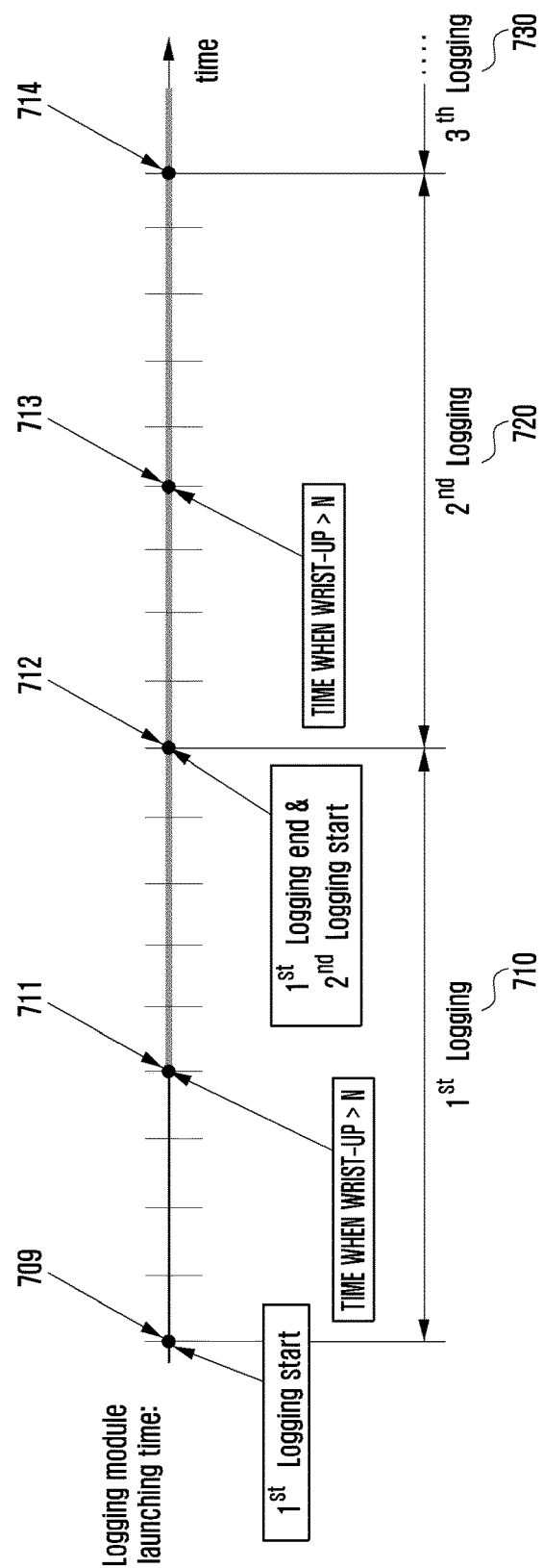

Referring to FIG. 7C, the electronic device 400 may use the acceleration sensor with a sampling frequency of 2 to monitor the movement of the electronic device 400 according to default settings. The electronic device 400 may count the number of times that the application is activated during a preset duration after initial activation at time 709. When the number of application activations exceeds a first threshold (e.g. n=20) at time 711, the electronic device 400 may use the acceleration sensor with a sampling frequency of 3 to monitor its movement.

At time 712 when the first interval 710 ends and the second interval 720 begins, the electronic device 400 may continue to use the acceleration sensor with a sampling frequency of 3 to monitor its movement.

When the number of application activations exceeds the first threshold at time 713 in the second interval 720, the electronic device 400 may continue to use the acceleration sensor with a sampling frequency of 3 to sense its movement from time 713 to time 714 when the second interval 720 ends. When the number of application activations exceeds the first threshold during the second interval 720, the electronic device 400 may continue to use the acceleration sensor with a sampling frequency of 3 during the third interval 730.

Figure 7D:
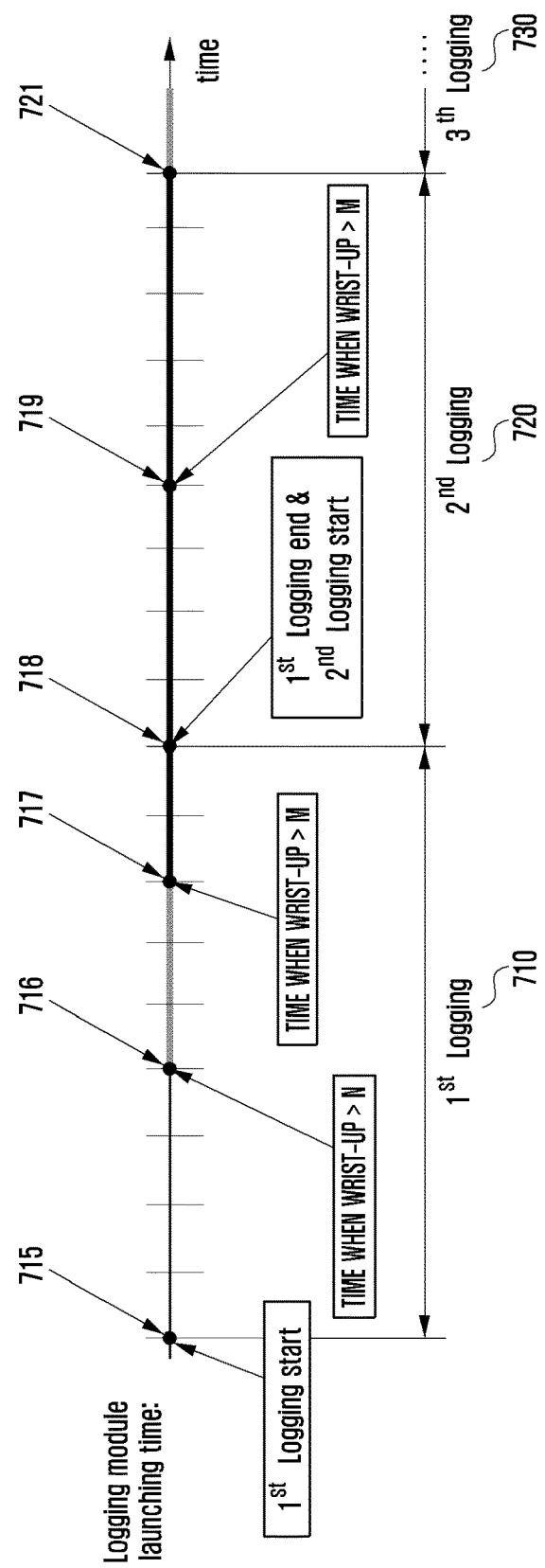

Referring to FIG. 7D, the electronic device 400 may use the acceleration sensor with a sampling frequency of 2 to monitor the movement of the electronic device 400 according to default settings. The electronic device 400 may count the number of times that the application is activated during a preset duration after initial activation at time 715.

When the number of application activations exceeds a first threshold (e.g. n=20) at time 716, the electronic device 400 may use the acceleration sensor with a sampling frequency of 3 to monitor its movement. When the number of application activations exceeds a second threshold (e.g. m=40) at time 717, the electronic device 400 may monitor its movement by using the acceleration sensor with a sampling frequency of 2 and the gyro sensor.

From time 718 when the first interval 710 ends to time 719 when the number of application activations exceeds the second threshold in the second interval 720, the electronic device 400 may continue to use the acceleration sensor with a sampling frequency of 2 and the gyro sensor to sense its movement. The electronic device 400 may continue to use the acceleration sensor with a sampling frequency of 2 and the gyro sensor to sense its movement from time 719 when the number of application activations exceeds the second threshold to the time when the second interval 720 ends.

If the number of application activations is greater than the first threshold and less than the second threshold during the second interval 720, the electronic device 400 use again the acceleration sensor with a sampling frequency of 3 at time 721 when the third interval 730 begins.

Figure 7E:
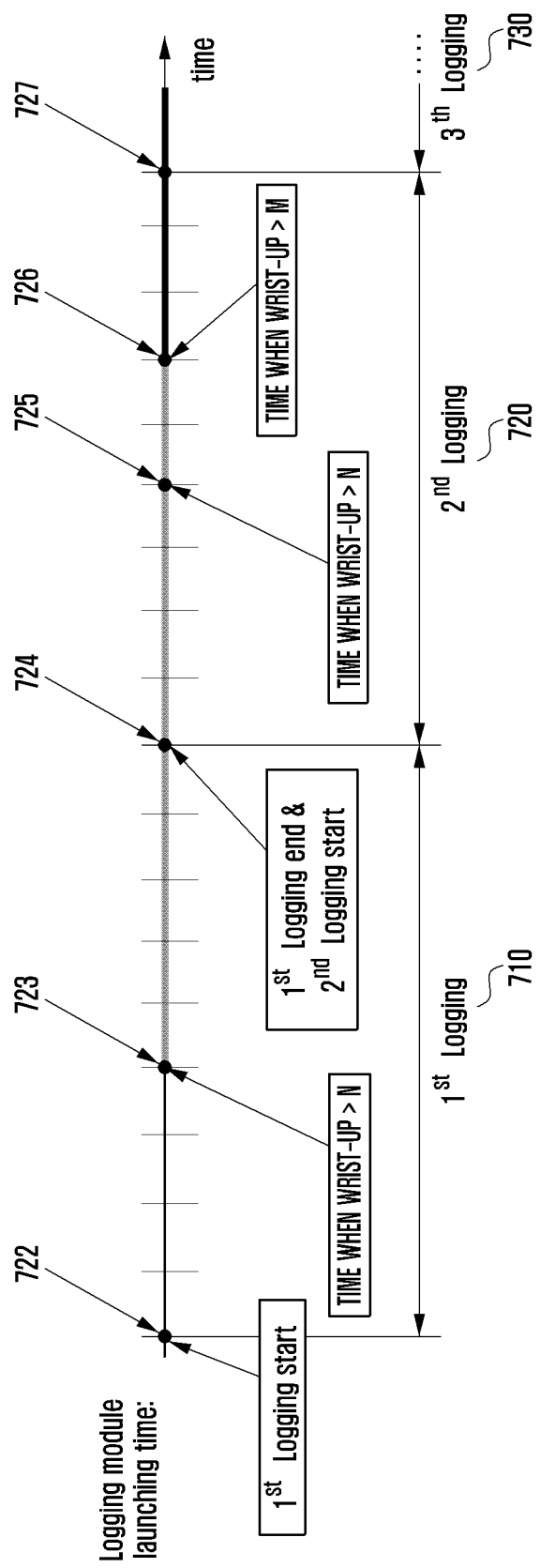

Referring to FIG. 7E, the electronic device 400 may use the acceleration sensor with a sampling frequency of 2 to monitor the movement of the electronic device 400 according to default settings. The electronic device 400 may count the number of times that the application is activated during a preset duration after initial activation at time 722.

When the number of application activations exceeds a first threshold (e.g. n=20) at time 723, the electronic device 400 may start to use the acceleration sensor with a sampling frequency of 3 to monitor its movement. The electronic device 400 may continue to use the acceleration sensor with a sampling frequency of 3 to monitor its movement until time 724 when the first interval 710 ends.

The electronic device 400 may continue to use the acceleration sensor with a sampling frequency of 3 to monitor its movement from time 724 when the second interval 720 ends and to time 725 when the number of application activations exceeds the first threshold. When the number of application activations exceeds the second threshold (e.g. 40) at time 726 in the second interval 720, the electronic device 400 may start to use the acceleration sensor with a sampling frequency of 2 and the gyro sensor to monitor its movement.

At time 727 when the third interval begins, the electronic device 400 may use the acceleration sensor with a sampling frequency of 2 and the gyro sensor to monitor its movement.

Figure 8:
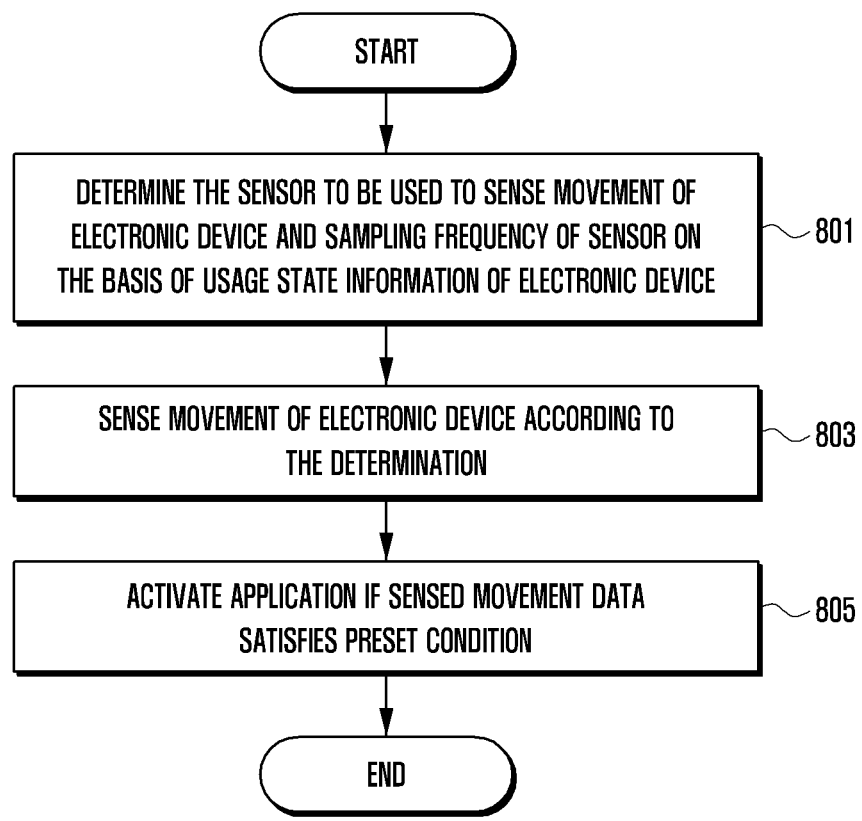
FIG. 8 is a flowchart of a method for activating an application in response to the sensed movement of the electronic device according to various embodiments of the present disclosure.

FIG. 8 is a flowchart of a method for activating an application in response to the sensed movement of the electronic device according to various embodiments of the present disclosure.

Referring to FIG. 8, at step 801, the electronic device 400 may determine at least one sensor to be used to sense the movement of the electronic device 400, and also the sampling frequency of the sensor based usage state information of the electronic device 400. The usage state information may include information regarding at least one of a frequency of application activations during a preset time period, and the state of the user of the electronic device 400. Application activation may indicate activating an application with a specific function (e.g. clock) or turning on the screen on the display 420.

In various embodiments, the electronic device 400 may count a number of times that the application is activated during a preset duration after initial activation. If the application is reactivated again, after expiration of the preset duration from initial activation, the electronic device 400 may count the number of times that the application is activated during the preset duration from the time when the application is activated again. For example, when the application is activated again 3 hours after the initial activation, the electronic device 400 may count a number of times that the application is activated until 4 hours have passed from initial activation (e.g., for another 1 hour). In one embodiment, the electronic device 400 may determine at least one of the sensors to be used to detect the movement of the electronic device 400 and the sampling frequency of the determined sensor according to whether the counted number of application activations exceeds at least one of multiple thresholds. For example, the electronic device 400 may store information on algorithms for individual thresholds (e.g. 20 activations and 40 activations). The electronic device 400 may apply the first algorithm when the number of application activations exceeds the first threshold (e.g. 20 activations), and may apply the second algorithm when the number of application activations exceeds the second threshold (e.g. 40 activations). Accordingly, the first and second algorithms may be used to determine the sensor to be used and/or the sampling frequency thereof.

In one embodiment, the electronic device 400 may utilize the number of application activations counted during a first interval of a given time to determine at least one of the sensor to be used to detect the movement of the electronic device 400 and the sampling frequency of the above sensor during a second interval occurring after the first interval. The electronic device 400 may change at least one of the sensors to be used to detect the movement of the electronic device 400 and the sampling frequency of the above sensor according to the number of application activations counted during the second interval.

In one embodiment, the electronic device 400 may identify the state of the user based on sensing data obtained by at least one sensor. For example, the electronic device 400 may identify the user state based on bio (e.g., biometric) information of the user obtained by a sensor (e.g. biosensor).

In one embodiment, the electronic device 400 may identify the state of the user based on a user input selecting one of user states. For example, the electronic device 400 may output a user interface window displaying multiple user states on the screen which are selectable.

In one embodiment, the electronic device 400 may receive user input selecting one of the displayed user states on the UI window. The electronic device 400 may determine at least one of the sensors to be used to detect the movement of the electronic device 400, and the sampling frequency of the above sensor according to the received user input. When the application is activated in response to detecting the corresponding user input, the graphical user interface of the application may displaying different images reflecting or corresponding to different user states.

At step 803, the electronic device 400 may detected the movement thereof according to the above determination. The electronic device 400 may monitor its movement using the selected the sensor and/or the sampling frequency.

At step 805, the electronic device 400 may activate the corresponding application if (e.g., when, responsive to) the sensed movement data satisfying a preset condition. The application may be an application that activates the display 420 or performs a specific function (e.g., a clock function).

Figure 9:
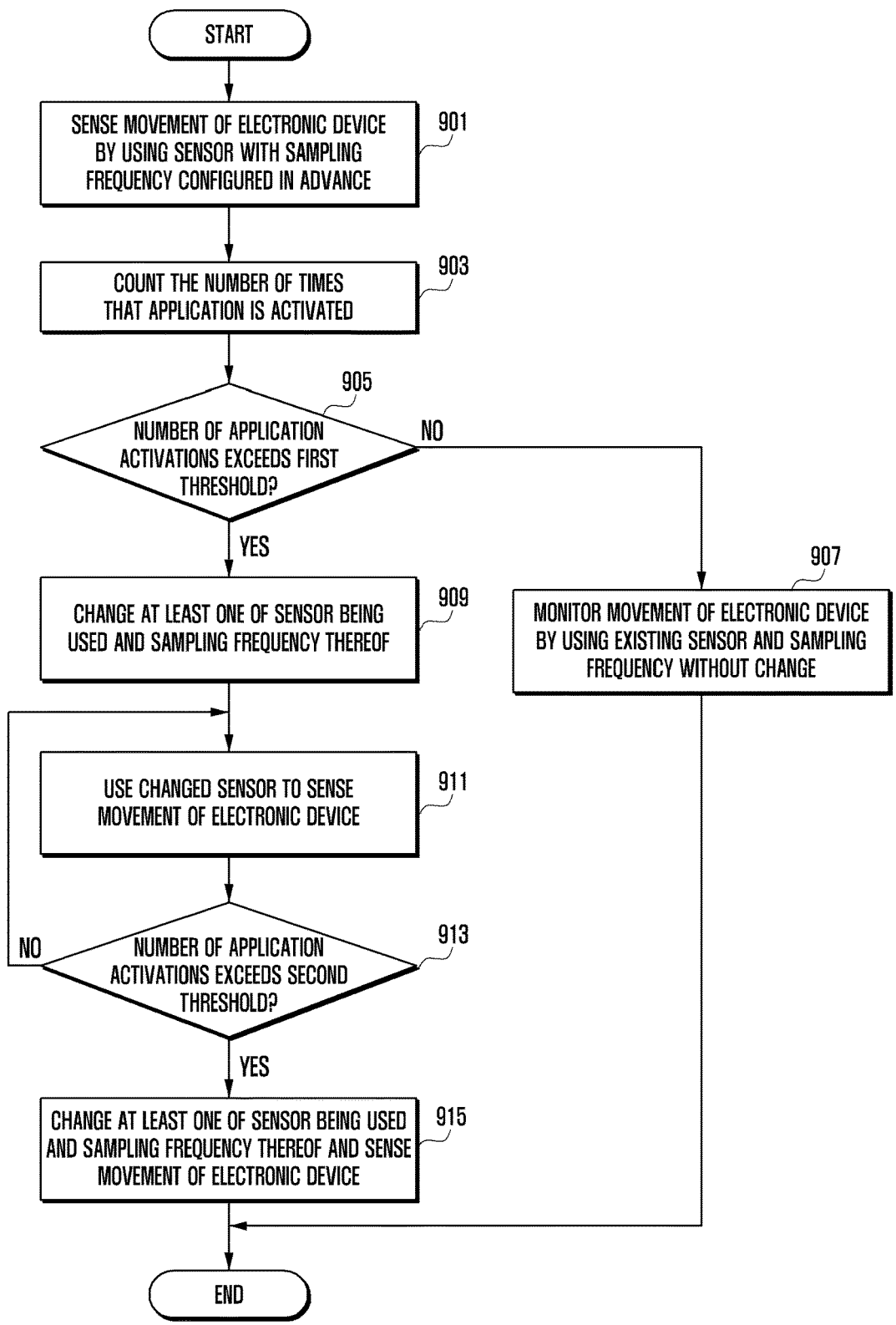
FIG. 9 is a flowchart of a method for activating an application in response to the sensed movement of the electronic device according to various embodiments of the present disclosure.

FIG. 9 is a flowchart of a method for activating an application in response to the detected movement of the electronic device according to various embodiments of the present disclosure.

Referring to FIG. 9, at step 901, the electronic device 400 may monitor the movement of the electronic device using a sensor set to utilize a sampling frequency configured in advance. For example, the electronic device 400 may detect the movement of the electronic device using an acceleration sensor with a sampling frequency of "2" (e.g., 2 samplings per unit time) according to pre-configured settings.

At step 903, the electronic device 400 may count the number of times that the application is activated. For example, the electronic device 400 may count the number of times that the application is activated during a preset time duration (e.g. one hour or two hours). The application may be activated according to a preset condition. For example, when the electronic device 400 is a wearable device, the electronic device 400 may activate the application if the motion of the user wearing the electronic device 400 matches the preset condition.

At step 905, the electronic device 400 determines whether the counted number of application activations exceeds a first threshold (e.g., 20 activations).

If the number of application activations does not exceed the first threshold, at step 907, the electronic device 400 may continue to monitor the movement thereof using the existing sensor and sampling frequency without change or modification.

If the number of application activations exceeds the first threshold, at step 909, the electronic device 400 may change at least one of the utilized sensor and the sampling frequency thereof (e.g., by switching to another sensor and/or a new sampling frequency). For example, if the number of application activations exceeds the first threshold (e.g., 20 activations), the electronic device 400 may change the sampling frequency of the acceleration sensor from "2" to "3."

At step 911, the electronic device 400 may use the changed sensor to detect movement. For example, the electronic device 400 may detect its own movement using the acceleration sensor, with the altered sampling frequency of 3.

At step 913, the electronic device 400 determines whether the counted number of application activations exceeds a second threshold (e.g., 40 activations). If the number of application activations does not exceed the second threshold, the electronic device 400 may continue to use the existing sensor and sampling frequency to monitor its movement.

If the number of application activations positively exceeds the second threshold, at step 915, the electronic device 400 may change at least one of the sensors being used and the sampling frequency thereof. For example, if the number of application activations exceeds the second threshold, the electronic device 400 may detect its movement using the acceleration sensor with a sampling frequency of 2 and the gyro sensor.

If sensed movement data satisfies a preset condition for application activation, the electronic device 400 may activate the application.

Figure 10:
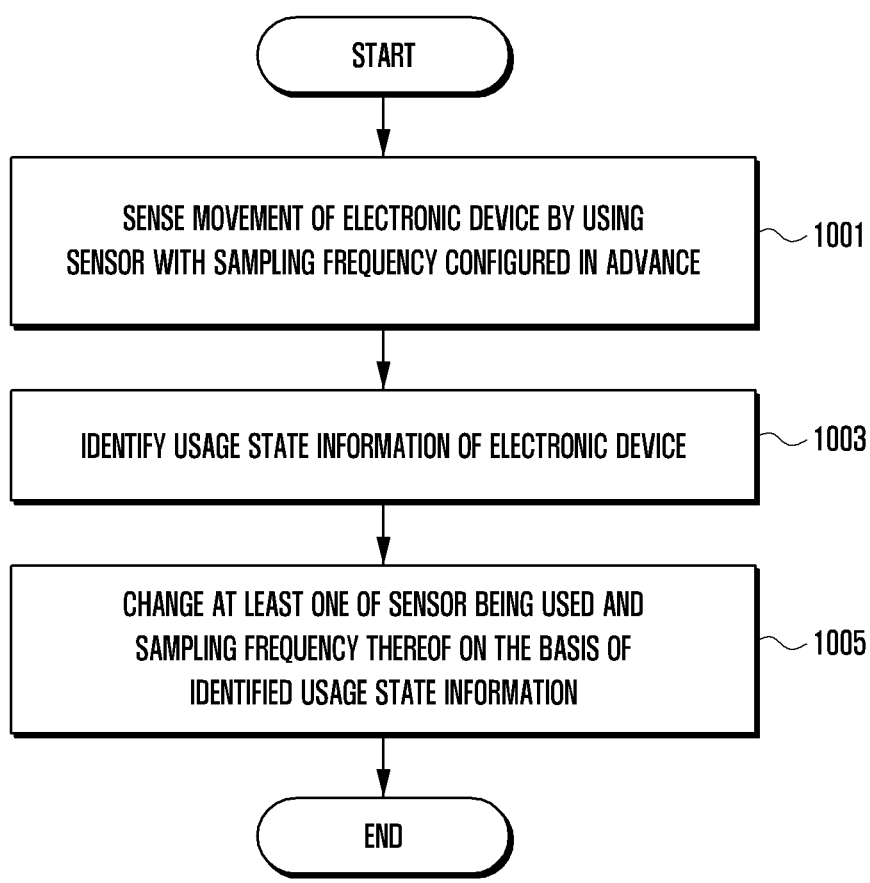
FIG. 10 is a flowchart of a method for activating an application in response to the sensed movement of the electronic device according to various embodiments of the present disclosure.

FIG. 10 is a flowchart of a method for activating an application in response to the sensed movement of the electronic device according to various embodiments of the present disclosure.

Referring to FIG. 10, at step 1001, the electronic device 400 may monitor the movement thereof by using a sensor with a sampling frequency configured in advance. For example, the electronic device 400 may sense the movement thereof using an acceleration sensor with a sampling frequency of 2 (e.g., 2 samplings per unit time).

At step 1003, the electronic device 400 may identify the state of the user. For example, the electronic device 400 may identify the user state based on sensing data detected using at least one sensor (e.g., a biosensor). As another example, the electronic device 400 may identify the state of the user based on a user input selecting one of user states.

At step 1005, the electronic device 400 may change at least one of the sensor being used (e.g., an acceleration sensor and gyro sensor) and the sampling frequency based on the identified user state. For example, upon determining that the user state is "sleeping," the electronic device 400 may use the acceleration sensor with a sampling frequency of 2 and the gyro sensor to more accurately detect any movement indicating an intention to cause activation of an application.

Figure 11:
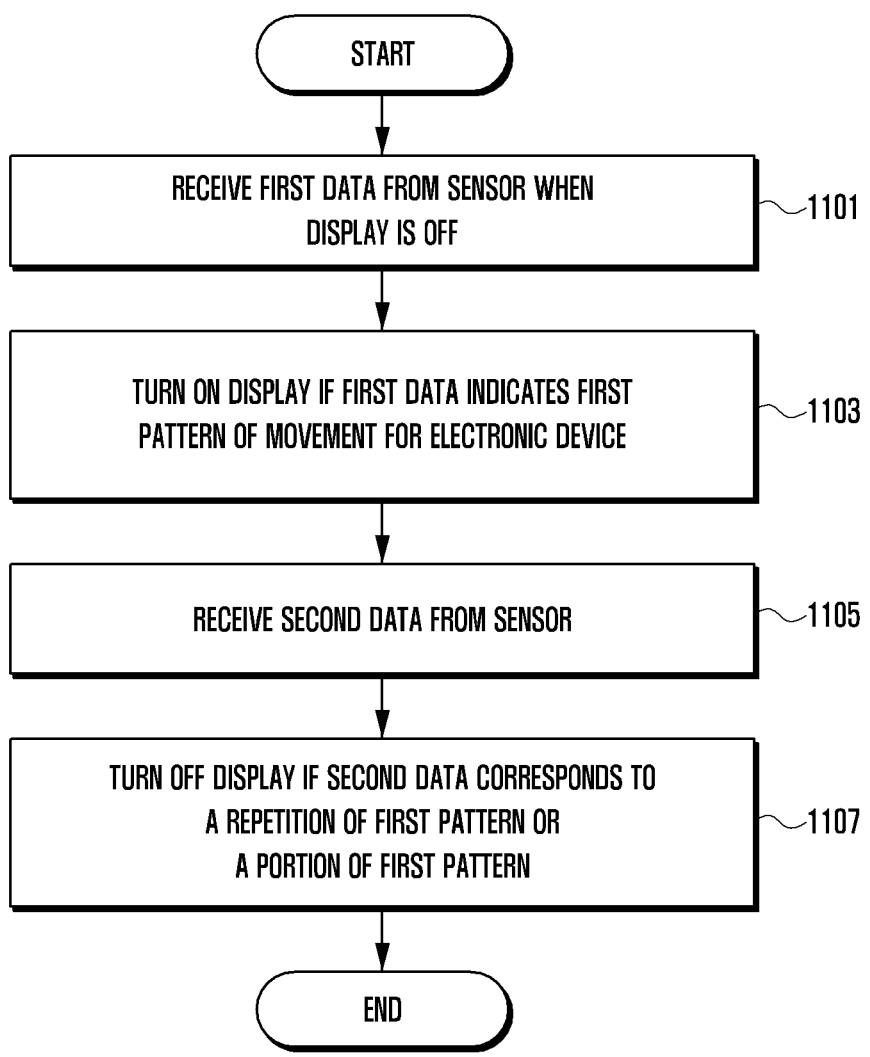
FIG. 11 is a flowchart of a method for activating an application in response to the sensed movement of the electronic device according to various embodiments of the present disclosure.

FIG. 11 is a flowchart of a method for activating an application in response to the sensed movement of the electronic device according to various embodiments of the present disclosure.

Referring to FIG. 11, at step 1101, when the display 420 is turned off, the electronic device 400 may receive first data from the sensor. For example, the electronic device 400 may receive data associated with the movement of the electronic device 400 from a gyro sensor and/or an acceleration sensor.

At step 1103, if the first data indicates a first pattern of movement for the electronic device 400 has been detected, the electronic device 400 may turn on the display 420. For example, if the received first data matches data preset for or pre-associated with the executable action of turning on the display, the electronic device 400 may activate the display 420.

At step 1105, the electronic device 400 may receive second data from the sensor. For example, the electronic device 400 may receive data associated with the movement of the electronic device 400 from the gyro sensor and/or the acceleration sensor. The second data may be associated with the movement of the electronic device 400.

At step 1107, if the second data corresponds to a repetition of the first pattern or a portion of the first pattern, the electronic device 400 may deactivate the display 420. For example, when the user of the electronic device 400 is playing tennis, the electronic device 400 may sense a pattern of repetitive movement for a preset time. When similar movement values (e.g., acceleration sensor values or gyro sensor values) are detected more frequently than a reference frequency during the preset time, the electronic device 400 may deactivate the display 420.

According to various embodiments of the present disclosure, a method for an electronic device to activate an application may include: determining at least one of a sensor to be used to detect the movement of the electronic device and the sampling frequency of the above sensor based on usage state information of the electronic device; detecting the movement of the electronic device according to the above determination; and activating the application if the detected movement data satisfies a preset condition. The usage state information may include information regarding at least one of the frequency for which an application or applications are activations during a preset period, and a detected state of the user of the electronic device.

Determining at least one of the sensor to be used and the sampling frequency may include: counting a number of times that the application is activated during a preset duration after initial activation; and counting, if the application is activated again after expiration of the preset duration from initial activation, a number of times that the application is activated during the preset duration after the time when the application was activated again.

Determining at least one of the sensor to be used and the sampling frequency thereof may include determining at least one of the sensor to be used to sense the movement of the electronic device and the sampling frequency of the above sensor according to whether the counted number of application activations exceeds at least one of multiple thresholds.

Determining at least one of the sensor to be used and the sampling frequency thereof may include utilizing the number of application activations counted during a first interval of a given duration for determining at least one of the sensor to be used to sense the movement of the electronic device and the sampling frequency of the above sensor during a second interval after the first interval.

The method may further include changing at least one of the sensor to be used to sense the movement of the electronic device and the sampling frequency of the above sensor according to the number of application activations counted during the second interval.

The method may further include at least one of identifying the state of the user on the basis of sensing data obtained by at least one sensor, and identifying the state of the user on the basis of user input for selecting one of user states.

Determining at least one of the sensor to be used and the sampling frequency thereof may include: displaying a user interface (UI) window showing multiple user states on the screen; receiving user input for selecting one of the user states on the UI window; and determining at least one of the sensor to be used to sense the movement of the electronic device and the sampling frequency of the above sensor according to the received user input.

When the application is activated in response to the user input, the graphical user interface (GUI) of the application may have different images for different user states. A programming module according to embodiments of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner.

Further, some operations may be executed according to another order or may be omitted, or other operations may be added. The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101. While the disclosure has been shown and described with reference to certain embodiments thereof, it will be understood by those skilled in the art that various changes in form and detail may be made therein without departing from the disclosure as defined by the appended claims.

What is claimed is:

1. An electronic device, comprising:
   one or more sensors;
   a processor; and
   a memory electrically coupled with the processor, storing one or more applications associated with one or more preset conditions,
   wherein the memory stores instructions executable by the processor to:
   select at least one sensor of the one or more sensors to detect movement of the electronic device and select a sampling frequency of the selected at least one sensor based on usage state information of the electronic device and a user activity state;

detect the movement of the electronic device using the selected at least one sensor at the selected sampling frequency; and when the detected movement corresponds to at least one preset condition of the one or more preset conditions, execute a specific application of the one or more applications associated with the at least one preset condition.

2. The electronic device of claim 1, wherein the usage state information comprises at least one of:

a count indicating a number of activations of the specific application during a first preset period of time, and information indicating a state of a user of the electronic device.

3. The electronic device of claim 2, wherein the instructions are further executable by the processor to:

generate the count indicating the number of times the specific application is activated during the first preset period of time, the first preset time indicating a time duration after an initial activation of the specific application; and when the specific application is reactivated after expiration of the time duration after the initial activation, count a second number of times that the specific application is activated in a second preset period of time starting from a time at which the specific application is reactivated.

4. The electronic device of claim 3, wherein the at least one sensor and the sampling frequency are selected according to whether the generated count exceeds at least one threshold.

5. The electronic device of claim 3, wherein the instructions are further executable by the processor to:

reselect a sensor of the one or more sensors and a sampling frequency to be utilized during the second preset period of time, based on the generated count indicating the number of times the specific application is activated during the first preset period of time.

6. The electronic device of claim 5, wherein the instructions are further executable by the processor to:

switch to another sensor of the one or more sensors for detecting the movement of the electronic device, and switch to another sampling frequency, based on the second number of times that the specific application is activated during the second preset period of time.

7. The electronic device of claim 2, wherein the instructions are further executable by the processor to:

receive the information indicating the state of the user based on sensing data detected by at least one sensor of the one or more sensors, and detecting a user input indicating the user activity state.

8. The electronic device of claim 7, wherein the instructions are further executable by the processor to:

control a display to display a user interface (UI) including one or more selectable user activity states; and detect the user input selecting one of the one or more selectable user activity states from the displayed UI, wherein the at least one sensor of the one or more sensors and the selected sampling frequency are selected at least partially based on the detected user input selecting one of the one or more selectable user activity states.

9. The electronic device of claim 8, wherein when the specific application is activated in response to the user input, a user interface of the application includes a plurality of icons, each representing a different user activity state.

10. The electronic device of claim 1, wherein the electronic device is a wearable device comprising a display, wherein the one or more sensors include a gyro sensor and an acceleration sensor, and wherein the specific application includes a clock-based function.

11. A method in an electronic device comprising:

storing in a memory one or more applications associated with one or more preset conditions;

selecting, by a processor, at least one sensor among one or more sensors for detecting a movement of the electronic device, and selecting a sampling frequency for the selected at least one sensor based on usage state information of the electronic device and a user activity state;

detecting the movement of the electronic device using the selected at least one sensor operating at the selected sampling frequency; and if the movement satisfies a preset condition of the one or more preset conditions, executing a specific application of the one or more applications associated with the preset condition.

12. The method of claim 11, wherein the usage state information comprises information of at least one of:

a count indicating a number of activations of the specific application during a first preset period of time, and information indicating a state of a user of the electronic device.

13. The method of claim 12, further comprising:

generating the count indicating the number of times the specific application is activated during the first preset period of time, the first preset time indicating a time duration after an initial activation of the specific application; and when the specific application is reactivated after expiration of the time duration after the initial activation, counting a second number of times that the specific application is activated in a second preset period of time starting from a time at which the specific application is reactivated.

14. The method of claim 13, wherein the at least one sensor and the sampling frequency are selected according to whether the generated count exceeds at least one threshold.

15. The method of claim 13, further comprising:

reselecting a sensor of the one or more sensors and a sampling frequency to be utilized during the second preset period of time, based on the generated count indicating the number of times the specific application is activated during the first preset period of time.

16. The method of claim 15, further comprising switching to another sensor of the one or more sensors for detecting the movement of the electronic device, and switching to another sampling frequency, based the second number of times that the specific application is activated during the second preset period of time.

17. The method of claim 12, further comprising receiving the information indicating the state of the user based on sensing data detected by at least one sensor of the one or more sensors, and detecting a user input indicating the user activity state.

18. The method of claim 17, further comprising controlling a display to display a user interface (UI) including one or more selectable user activity states; and detecting the user input selecting one of the one or more selectable user activity states from the displayed UI, wherein the at least one sensor of the one or more sensors and the selected sampling frequency are selected at least partially based on the detected user input selecting one of the one or more selectable user activity states.

19. The method of claim 18, wherein, when the specific application is activated in response to the user input, a user interface of the application includes a plurality of icons, each representing a different user state.

20. An electronic device comprising:
a housing;
a fastener mounted on a portion of the housing and removably attachable to a user;
a display exposed through a portion of the housing;
at least one sensor disposed within the housing and configured to detect movement of the electronic device;
a processor disposed within the housing and electrically coupled with the display and the at least one sensor; and
a memory electrically coupled with the processor, the memory storing instructions executable by the processor to:
receive first data from the at least one sensor when the display is deactivated;
in response to detecting that the first data indicates a first pattern of movement of the electronic device, activate the display;
receive second data from the sensor after the display is activated; and
in response to detecting that the second data indicates that a repetition of the first pattern exceeds a reference value, deactivate the display.

21. The electronic device of claim 20, wherein the instructions are further executable by the processor to:
in response to the detecting that the second data indicates that the repetition of the first pattern exceeds the reference value, change a designated pattern for activating the display from the first pattern to a second pattern so that the display is not activated by detecting the first pattern.

* * * * *